Nov. 1, 1932.  C. G. BANKS  1,885,886
UNIVERSAL CONNECTION FOR ALL METAL ROTARY HOSE FOR OIL WELLS
Filed Nov. 12, 1929  2 Sheets-Sheet 2
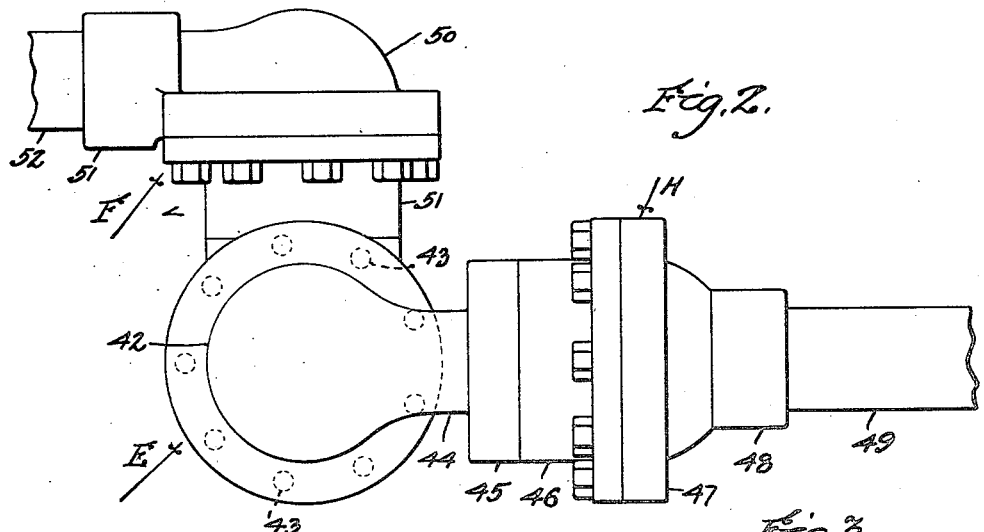
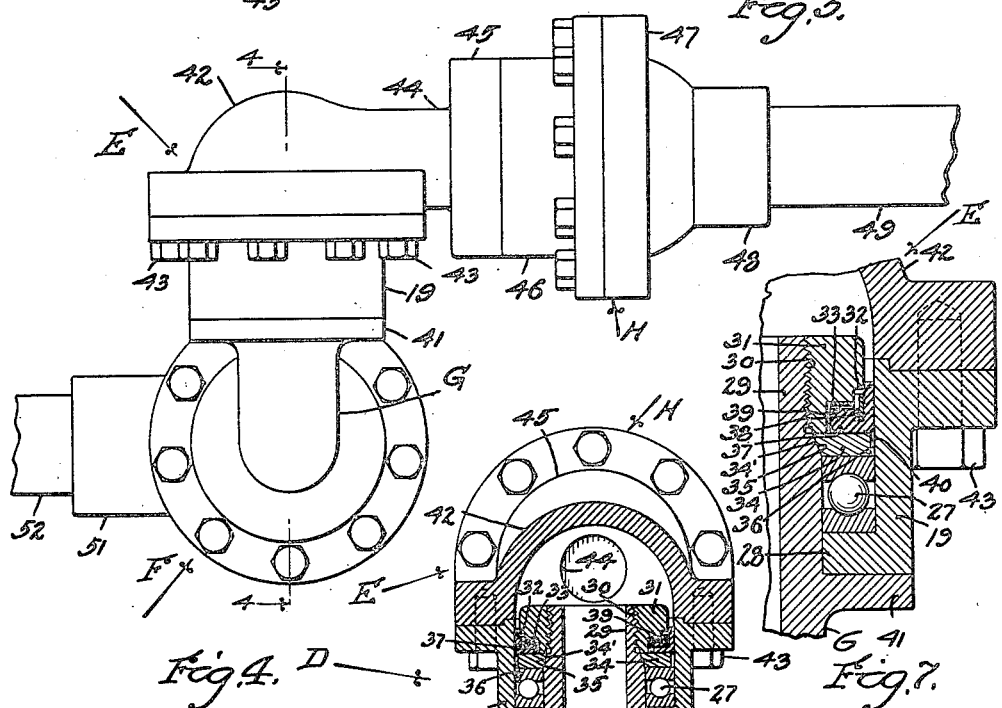

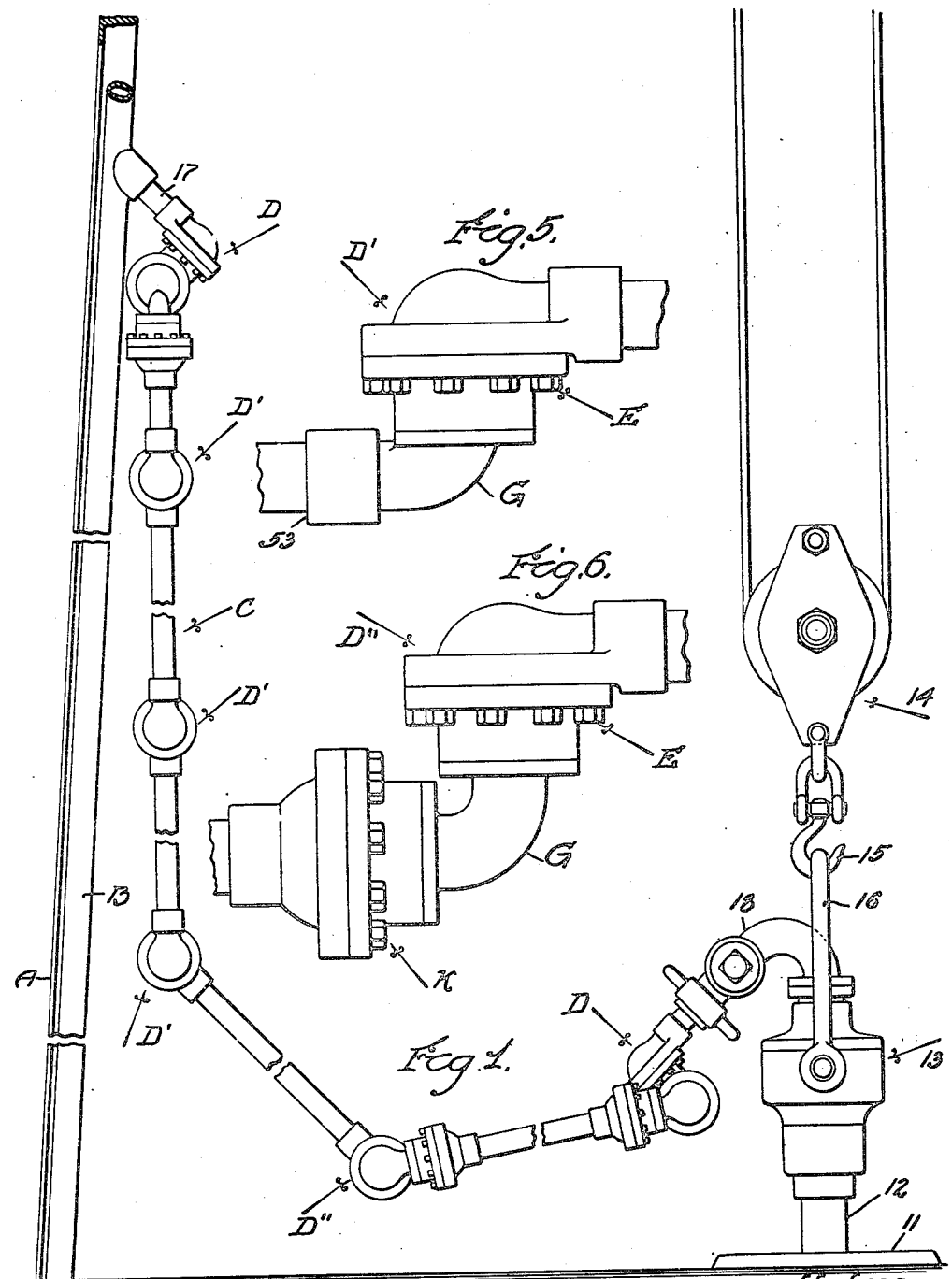

Patented Nov. 1, 1932

1,885,886

UNITED STATES PATENT OFFICE

CHARLES G. BANKS, OF LOS ANGELES, CALIFORNIA

UNIVERSAL CONNECTION FOR ALL METAL ROTARY HOSE FOR OIL WELLS

Application filed November 12, 1929. Serial No. 406,580.

This invention relates to rotary hose of the type used in connection with hydraulic rotary drilling equipment for drilling oil wells and the like, and deals particularly with universal joints for use in an all metal hose of this character and a unit construction for producing the same. Reference is made to my copending application, Serial No. 366,202, filed May 27, 1929, entitled All metal high pressure hose for oil wells wherein I have illustrated and described a type of hose of the character involved in this invention.

The demand for a rotary hose that will withstand excessively high pressure has become increasingly insistent with the advent of deep oil well drilling. It is well known by those versed in the art of oil well drilling that the present type of rotary hose available is a source of constant trouble and expense in drilling oil wells. Many types of expensive flexible hose have been built and used without any marked success in reducing the trouble caused by such hose. In my aforesaid copending application, I have disclosed an all metal rotary hose which embodies swivel joints in combination with short sections of pipe and provides a hose of suitable flexibility to meet the requirements of a rotary hose as and for the purpose set forth. A hose of the construction described in the aforementioned said application has many of the advantages demanded by oil well drillers. In a hose of the above mentioned character, the objection which drillers have to a flexible fabric hose, namely, that it deteriorates in coming in contact with the oil which the circulating fluid has absorbed from the well or other sources, is obviated by the use of metal throughout the hose. The additional concern of well drillers over a suitable coupling for a fabric hose with the rotary swivel head and the standpipe is also eliminated by providing a screw-threaded connection for each. In addition, an all metal hose is capable of withstanding higher pressure than a fabric hose; the strength of an all metal hose may, by proper design, be made equal to or even greater than the strength of the drill string. Furthermore, the life of an all metal hose as compared to a fabric hose is considerably longer. In producing my hose as specified in the above mentioned copending application. I have incorporated with sections of pipe a new and unique swivel joint having various advantageous features.

It is an object of this invention to provide a universal joint for an all metal rotary hose of the character described that lends itself readily to economy of manufacture.

Another object is to provide a single swing joint of simple and durable construction and to so engage a pair of swing joints as to produce a joint having movement in two planes particularly adaptable to a hose of the above type, but not a movement of the universal character; such a movement being more specifically defined as a combination of a swing and swivel movement.

The power required to turn a joint of the character involved in this invention under the high pressures encountered in practice enters largely into this invention. With working pressures ranging from 500 pounds to 600 pounds per square inch, and sometimes approaching 2000 pounds per square inch, the latter occasioned by water hammers occuring in the drill string, it is evident that some means of reducing friction in the movable bearing parts of the joints would be highly advantageous. Accordingly, it becomes a further object of this invention to provide joints of the character described having ball bearings arranged to take the bulk of the load caused by the pressure within the joint.

In order to insure a perfect fluid seal within the joint, I have embodied cup leathers therein and in consideration of the fact that cup leathers need frequent replacement, I have designed a means of mounting said cup leather in a manner to make the leather readily accessible and easily removable. This feature is to be considered as a marked advancement in joints of this character in that a more desirable joint is provided and one in which the parts are more economically manufactured.

It is another object of this invention to provide a unit construction that may be assembled in a series of units to produce joints of the foregoing described character.

Other objects and advantages will become apparent upon a reading of the description of the drawings, in which Fig. 1 is a fragmentary view showing my invention as incorporated with a conventional hydraulic rotary drilling outfit;

Fig. 2 is a vertical elevation of my universal joint completely assembled;

Fig. 3 is a plan view of Fig. 2;

Fig. 4 is a vertical section taken on the line 4—4 of Fig. 3;

Fig. 5 is an elevational view of a single swing joint structure;

Fig. 6 is an elevational view of a combination swing and swivel joint; and

Fig. 7 is an enlarged fragmentary view of Fig. 4.

In the drawings, I have shown my invention as employed in combination with the conventional hydraulic rotary drilling outfit which consists of a rotary table 11 having the usual kelly 12 mounted therein. A swivel head generally designated at 13 is mounted in the usual manner upon the kelly 12 and a block and tackle generally des'gnated at 14 having a hook 15 arranged to engage the bail 16 of the swivel head 13 is provided thereabove in the well known manner. In combination with the foregoing, I have shown a fragment of a derrick leg designated at A and having attached thereto a conventional standpipe B. The standpipe B is provided with a gooseneck 17, and the swivel head 13 is likewise provided with a similar gooseneck 18. Connecting the goosenecks 17 and 18, I have shown an all metal hose of the character described in my aforesaid co-pending application generally designated at C. In the hose C I have incorporated my invention and have designated it D, D', and D'', to signify the different types of joints contemplated. As before stated, my invention provides a new and unique universal joint to be incorporated in an all metal rotary hose, and for this purpose provides a pair of swing joints generally designated E and F, connected by an elbow G and a swivel joint H arranged on the outlet of either of the swing joints E or F, in this instance the swing joint E being used for illustrative purposes (see Figs. 2, 3, and 4). At this point, it may be stated that the structure of the two swing joints E and F, and the swivel joint H is identical with the exception that the outlet of the swivel joint H is positioned on the axis of turning instead of at right angles thereto as in the case of the joints E and F. The arrangement thus provided produces a universal movement which meets the requirements of an all metal rotary hose for oil well drilling equipment and is designated D.

The swing joint E is shown as comprising a casing 19. Means is provided for rotatably mounting an open end of the elbow G within the casing 19 and as shown consists of a ball bearing member 27 supported upon an inwardly extending annular flange 28 formed upon the casing 19. The inner extending end 29 of the elbow G is screwthreaded as shown at 30, and a collar 31 is mounted thereon.

The collar 31 is formed with a series of annularly stepped shoulders 32 and 33, the purpose of said stepped shoulders being to provide a means of forcing a ring 34 having an inwardly tapered opening 34' therethrough, against a tapered shoulder 35 on the portion 29 of the elbow G. The outer periphery of the ring 34, as shown, does not contact the inner wall 36 of the casing 19 but is recognized as providing an all metal seal between the ring 34 and the portion 29 by means of the tapered opening 34' and the shoulder 35. The ring 34 also acts as a means of supporting the elbow G upon the roller bearing 27. Leakproof means are provided between the collar 34 and the casing 19 and consist of a cup leather 37 mounted upon the ring 34 and bearing against the inner wall 36 of the casing 19. In order that the cup leather 37 is in constant engagement with the inner wall 36 a spring ring 38 is fitted against the inner side of the upwardly extending part of the cup leather and forces that part of the leather against the wall 36. The means for holding the cup leather 37 downwardly against the ring 34 consists of a spring washer 39 pressed against the portion of the cup leather directly above the washer 34 by means of the shoulder 33 on the collar 31. It is obvious that under this arrangement the cup leather seals the space 40 existing between the outer edge of the ring 34 and the wall 36 and that the cup leather is at all times held in contact with the wall 36 and the ring 34 in a manner to effect a perfect seal therebetween. The elbow G is further equipped with a flange 41 arranged to engage the outer side of the inwardly extending flange 28 of the casing 19. It is evident from the foregoing structure that a leakproof turnable joint is made between the casing 19 and the elbow G in a manner to leave readily accessible all parts thereof. It is to be understood that a similar mounting is provided on each end of the elbow G, which in assembled relation produces an assembly having rotative movement in two planes at substantially right angles respectively.

To complete the assembly and provide a further movement to the joint, a closure head 42 is arranged over the casing 19 and is attached thereto by means of bolts 43. The head 42 is provided with a fluid passage 44 extending at right angles to the axis of rotation and is outwardly formed with a flange 45 identical with the flange 41 shown in Fig. 4, and is similarly provided with a screw-threaded extending portion identical to that part 29 of the elbow G shown in Fig. 4. The internal arrangement of parts to produce the swivel joint H is identical with that described with reference to joint E and includes a casing 46 equivalent to casing 19 having a closure head 47 mounted thereon in a manner similar to the mounting of the head 42. A conduit connection 48 extends from the head 47 and is adapted to receive in an ordinary manner conduit 49 which is axially positioned with respect to the axis of rotation. The foregoing arrangement will be appreciated as providing a swivel movement in addition to the double swing movements provided on opposite ends of the elbow G. As a closure for the joint F, I have provided a head 50 which is mounted upon a casing 51 in a suitable manner, the casing 51 corresponding to the casing 19. In order to obtain the movement contemplated, I have provided the head 50 with a conduit connection 51 arranged to receive an ordinary conduit 52 and have so positioned said conduit that the passage therethrough is substantially at right angles to the axis of rotation. The result of combining these three movements into one assembly is to produce a single unit having universal movement therein. It can be readily appreciated that movement between the conduit 49 and the conduit 52 may be of a true universal nature. This movement becomes particularly useful, as before stated, at the points of connecting the hose with the gooseneck on the standpipe on the derrick leg and the gooseneck upon the swivel head and in its entirety is designated D. In hose of the type contemplated by this invention, it becomes imperative that some means be provided at these points of connection for relieving undue strain upon the hose and for permitting necessary movement of the entire hose between said connections, which movement may at times amount to a universal movement. The foregoing structure will be recognized as fulfilling these requirements.

However, my invention also includes a swing joint designated D' and a combination swing and swivel joint designated D" for use in the main body of the hose in combination with the universal joint D above described, which joints are provided as follows:

In Fig. 5 I have shown a single swing joint D'. The structure involved in this arrangement is similar to the previously described structure with relation to Fig. 4, the difference being that the elbow G is provided with a conduit connection 53 at one end instead of the swing joint E. In this instance, the opposite end of the elbow G is equipped with the swing joint arrangement identical to the joint F described in relation with Figs. 2, 3, and 4. This structure will be readily appreciated as providing a swing movement in one plane only. This type of joint is employed mainly in the intermediate connections of the hose and under this arrangement provides sufficient flexibility throughout the main bulk of the hose to satisfy the requirements of rotary oil well drilling.

In Fig. 6 the arrangement is designated D" and is substantially the same as in Fig. 5 except that in place of the conduit connection 53 a swivel joint K is provided similar to the swivel joint H shown and described in Figs. 2, 3, and 4. This arrangement will be appreciated as providing a swing and a swivel movement. The means of providing relative rotation in the parts throughout this arrangement are identical with that means described in relation to Fig. 4.

It is to be understood that my invention consists primarily in providing a series of joints particularly useful in an all metal hose of the character described and to provide a unit construction which is capable of various adaptations to produce such a series of modified joints, each for a special purpose in said hose. In practice, it has been found that joints of the character illustrated in Figs. 2 and 3 should be incorporated in the hose line at the connection between the gooseneck on the standpipe and the gooseneck on the swivel head and that at least one joint such as is illustrated in Fig. 6 should be incorporated in an intermediate connection of pipe sections and that when joints such as illustrated in Fig. 5 are used throughout the hose in combination with the other joints an all-metal hose having flexibility sufficient to meet all requirements of rotary oil well drilling is produced.

Although I have shown and described my swivel joint in connection with an all-metal rotary hose, it is to be recognized that this structure is adaptable to other purposes and may be used with advantageous results in combination with a fabric hose. It is also apparent that joints of the character set forth in this invention have other applications wherein they may be used to great advantage. In this respect it may be stated that such joints would have high value in fire-fighting equipment wherein great pressure is employed. I am also aware of other uses to which my joints may be applied, and I intend the foregoing disclosure to include all such uses and modifications of my joints that come within the scope of the specification and the purview of the claims.

I claim as my invention:

1. A universal joint for a rotary hose for oil wells including: an elbow; means on each end of said elbow for swingingly mounting a conduit connection, said means comprising a casing; a closure head having a conduit connection mounted upon said casing; means for rotatably supporting an open end of said elbow in said casing, said last mentioned means including a collar mounted on the inner portion of said elbow; an inwardly extending flange formed on said casing; and anti-friction means interposed between said collar and said flange, said elbow having a flange arranged to rotatably bear against the outer surface of said inwardly extending flange on said casing.

2. A universal joint for a rotary hose for oil wells including: an elbow; means on each end of said elbow for swingingly mounting a conduit connection, said means comprising a casing; a closure head having a conduit connection mounted upon said casing; means for rotatably supporting an open end of said elbow in said casing, said last mentioned means including a collar mounted on the inner portion of said elbow; an inwardly extending flange formed on said casing; anti-friction means interposed between said collar and said flange, said collar being adapted to seat upon a tapered shoulder on said elbow; and means for forcing said collar upon said shoulder to effect a fluid seal therebetween.

3. A universal joint for a rotary hose for oil wells including: an elbow; means on each end of said elbow for swingingly mounting a conduit connection, said means comprising a casing; a closure head having a conduit connection mounted upon said casing; means for rotatably supporting an open end of said elbow in said casing, said last mentioned means including a collar mounted on the inner portion of said elbow; an inwardly extending flange formed on said casing; anti-friction means interposed between said collar and said flange, said collar being adapted to seat upon a tapered shoulder on said elbow; and means for forcing said collar upon said shoulder to effect a fluid seal therebetween, said last mentioned means consisting of a nut screw-threadedly mounted upon the end of said elbow and arranged to bear upon said collar.

4. A universal joint for a rotary hose for oil wells including: an elbow; means on each end of said elbow for swingingly mounting a conduit connection, said means comprising a casing; a closure head having a conduit connection mounted upon said casing; means for rotatably supporting an open end of said elbow in said casing, said last mentioned means including a collar mounted on the inner portion of said elbow; an inwardly extending flange formed on said casing; anti-friction means interposed between said collar and said flange, said collar being adapted to seat upon a tapered shoulder on said elbow; means for forcing said collar upon said shoulder to effect a fluid seal therebetween, said last mentioned means consisting of a nut screw-threadedly mounted upon the end of said elbow and arranged to bear upon said collar; and a cup leather arranged to operate as a fluid seal between said casing and said collar.

5. A universal joint for a rotary hose for oil wells including: an elbow; means on each end of said elbow for swingingly mounting a conduit connection, said means comprising a casing; a closure head having a conduit connection mounted upon said casing; means for rotatably supporting an open end of said elbow in said casing, said last mentioned means including a collar mounted on the inner portion of said elbow; an inwardly extending flange formed on said casing; anti-friction means interposed between said collar and said flange, said elbow having a flange arranged to rotatably bear against the outer surface of said inwardly extending flange on said casing, said collar being adapted to seat upon a tapered shoulder on said elbow; means for forcing said collar upon said shoulder to effect a fluid seal therebetween, said last mentioned means consisting of a nut screw-threadedly mounted upon the end of said elbow and arranged to bear upon said collar; a cup leather arranged to operate as a fluid seal between said casing and said collar; and resilient means for forcing said cup leather into constant engagement with the inner wall of said casing.

6. In means of the general character described, including a casing having one end of an elbow rotatably mounted therein; a fluid seal embodying a collar adapted to set upon a tapered seat formed on the inner end of said elbow and effect a fluid seal therebetween; means separate from said collar for holding same on said seat; and a cup leather arranged to seat upon said collar and form a fluid seal between said collar and the inner wall of said casing.

7. A universal joint for rotary hose for oil wells embodying: an elbow; means on each end of said elbow for swingingly supporting a conduit connection, said means comprising a casing, a closure head having a conduit connection mounted upon said casing; means for supporting an open end of said elbow in said casing, said last mentioned means including a collar mounted on the inner portion of said elbow; an outwardly extending flange on said elbow engaging the end of said casing opposite said conduit connection; and an anti-friction bearing member in said casing engaging said elbow.

8. A joint for a rotary hose for oil wells embodying: a conduit section; means on one end of said conduit section for swingingly mounting a conduit connection, said means comprising a casing, a closure head having a conduit connection mounted upon said casing, means for rotatably supporting an open end of said conduit section in said casing, said last mentioned means including a collar mounted on the inner portion of said conduit section, an inwardly extending flange formed on said casing, and anti-friction means interposed between said collar and said flange, said conduit sections having a flange arranged to rotatably bear against the outer surface of said inwardly extending flange on said casing.

In testimony whereof, I have hereunto set my hand at Los Angeles, California, this 5th day of November, 1929.

CHARLES G. BANKS.